Patented Nov. 20, 1923.

1,474,587

UNITED STATES PATENT OFFICE.

CARL HEIDENREICH, OF LEVERKUSEN, NEAR COLOGNE-ON-THE-RHINE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AZO DYSTUFFS.

No Drawing.   Application filed April 17, 1922.   Serial No. 553,984.

*To all whom it may concern:*

Be it known that I, CARL HEIDENREICH, a citizen of Germany, residing at Leverkusen, near Cologne-on-the-Rhine, Germany, have invented new and useful Improvements in Azo Dyestuffs, of which the following is a specification.

My invention relates to the manufacture and production of new yellow azodyes having in a free state most probably the following general formula:

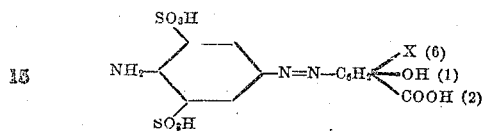

(X meaning H and $CH_3$).

The new dyestuffs can be obtained by combining the diazocompounds of para-phenylene diamin-2.6-disulfonic acid with a phenol-ortho-carboxylic acid, e. g. salicylic and cresotinic acid.

They are after being dried and pulverized in the shape of their sodium salts from greyish-yellow to violet powders which are soluble in water generally with a yellowish coloration. They can be printed on cotton together with chromium acetate, pure greenish-yellow shades fast to soap and chlorin being thus obtained. Together with methylene blue they furnish valuable green pigments fast to light. Upon treatment with tin and hydrochloric acid the dyes are split up into para-phenylene-diamin-2.6-disulfonic acid and a para-aminophenolcarboxylic acid such as para-aminosalicylic acid or para-amino-cresotinic acid.

In order to illustrate the new process more fully the following example is given, the parts being by weight.

29 parts of the monosodium salt of para-phenylene-diamin-2.6-disulfonic acid are dissolved in 120 parts of water, 15 parts of a 30 per cent hydrochloric acid are added and the resulting solution is cooled to 10° C. Subsequently a solution of 6.9 parts of sodium nitrite in 50 parts of water is added and then a solution of 14 parts of salicylic acid in 100 parts of water and the necessary amount of caustic soda lye. The mixture is cooled with ice down to zero and a 10 per cent solution of 10 parts of sodium hydroxid is added in the course of one hour to the solution which has to be stirred. Stirring is continued for several hours and the mixture is acidulated with hydrochloric acid. The coloring matter separates. It is filtered off and dried.

According to the quantity of free hydrochloric acid the dye contains it is after being dried and pulverized a yellow to dark violet powder soluble in water with a yellowish coloration. It has in a free state probably the following formula:

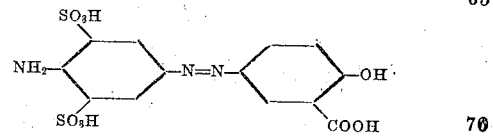

Upon treatment with tin and hydrochloric acid it is split up into para-phenylene-diamin-2.6-disulfonic acid and para-amino-salicylic acid. It dyes chromed cotton yellow shades.

I claim:

1. The herein-described new azodyestuffs derived from diazotized para-phenylene-diamin-2.6-disulfonic acid and a phenol-ortho-carboxylic acid which dyes have most probably the following formula:

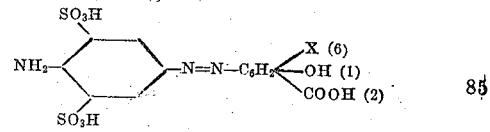

(X meaning H and $CH_3$).

which are after being dried and pulverized greyish-yellow to violet powders soluble in water with a yellowish coloration; dyeing chromed cotton pure greenish-yellow shades fast to soap and to chlorin; yielding upon reduction with tin and hydrochloric acid para-phenylene-diamin-2.6-disulfonic acid and a para-amino-phenol-ortho-carboxylic acid, substantially as described.

2. The herein described new azodye derived from diazotized para-phenylene-diamin-2.6-disulfonic acid and salicylic acid having in a free state most probably the formula:

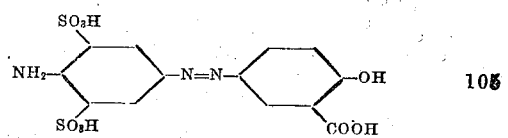

which is after being dried and pulverized a yellow to dark violet powder soluble in water with a yellowish coloration; yielding upon reduction with tin and hydrochloric acid para-phenylene-diamin-2.6-disulfonic acid and para-salicylic acid; dyeing chromed cotton yellow shades fast to soap and to chlorin substantially as described.

In testimony whereof I have hereunto set my hand in the presence of two subscribing witnesses.

CARL HEIDENREICH.

Witnesses:
HEINY W. HAAR,
ALBERTINE PORGER.